US006200401B1

(12) United States Patent
Watkins et al.

(10) Patent No.: US 6,200,401 B1
(45) Date of Patent: *Mar. 13, 2001

(54) METHOD OF DETERMINING GROOVE ANGLE TO GIVE OPTIMUM TREAD WEAR

(75) Inventors: David Robert Watkins, Sutton Coldfield; Michael Jackson, Birmingham, both of (GB)

(73) Assignee: Sumitomo Rubber Industries, Limited, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/164,459

(22) Filed: Oct. 1, 1998

(30) Foreign Application Priority Data

Oct. 3, 1997 (GB) .................................................. 9720914

(51) Int. Cl.$^7$ .......................... B29D 30/00; B60C 11/113; B60C 103/04; B60C 115/00; B60C 123/00

(52) U.S. Cl. .................................. 156/110.1; 152/209.11; 152/209.17; 152/209.28; 152/903; 152/904; 703/1; 703/8

(58) Field of Search ........................ 152/209.11, 209.17, 152/209.18, 209.28, 903, 904, DIG. 3; D12/149, 151; 156/110.1; 703/1, 8

(56) References Cited

U.S. PATENT DOCUMENTS

| | | | |
|---|---|---|---|
| 1,127,517 | * | 2/1915 | Richardson ...................... 152/209.28 |
| 3,409,064 | * | 11/1968 | Leonard ........................... 152/209.17 |
| 3,637,001 | * | 1/1972 | Roberts et al. ................... 152/209.17 |
| 3,645,313 | * | 2/1972 | Roberts et al. ................... 152/209.17 |
| 4,057,089 | * | 11/1977 | Johannsen ........................ 152/209.28 |
| 4,266,592 | * | 5/1981 | Takigawa et al. ............... 152/209.17 |
| 4,364,426 | * | 12/1982 | Mills et al. ........................ 152/209.11 |
| 5,027,876 | * | 7/1991 | Chrobak et al. ................. 152/209.17 |
| 5,152,854 | * | 10/1992 | Matsumoto ....................... 152/209.28 |
| 5,714,026 | * | 2/1998 | Wakabayashi ...................... 156/110.1 |
| 5,964,266 | * | 10/1999 | Boiocchi et al. ..................... 152/903 |

FOREIGN PATENT DOCUMENTS

| | | | | |
|---|---|---|---|---|
| 368553 | * | 5/1990 | (EP) | ................................. 152/209.11 |
| 906837 | * | 4/1999 | (EP) | . |
| 63-116907 | * | 5/1988 | (JP) | ................................. 152/209.11 |
| 63-121505 | * | 5/1988 | (JP) | ................................. 152/209.11 |
| 6-55909 | * | 3/1994 | (JP) | ................................. 152/209.11 |

\* cited by examiner

*Primary Examiner*—Steven D. Maki
(74) *Attorney, Agent, or Firm*—Birch, Stewart, Kolasch & Birch, LLP

(57) ABSTRACT

A tire for a two-wheeled vehicle comprising a ground contacting tread having at least one tread groove formed therein and extending axially from the tread center to the tread edge, wherein in a first region of the tire tread, which is the central tread region and is the region of contact between the tire and the ground when the motorcycle is in the condition of moving in a straight line, the alignment of the tread groove is substantially circumferential, and in a second region of the tire tread, which is at the axial edge of the tread and is the region of contact when the motorcycle is in the condition of turning under maximum cornering, the alignment of the tread grooves is substantially transverse, and in a third region, which is the tread region between the first central region and the second axial region and which is the ground contacting region when the motorcycle is turning at less than the maximum cornering condition, the groove alignment changes progressively axially outwardly from substantially circumferential to substantially transverse so that in the first, second and third axial regions of the tire tread the tread grooves are substantially aligned with the resultant forces acting on the tire tread surface in the contact region between the tread and with the ground.

3 Claims, 3 Drawing Sheets

FRONT TYRE ROTATION: F ↓

REAR TYRE ROTATION: R ↑

METHOD OF DETERMINING GROOVE ANGLE TO GIVE OPTIMUM TREAD WEAR

The invention relates to a tire for a two-wheeled vehicle such as a motorcycle or motorscooter.

Such tires utilize treads which in transverse cross-section are sharply curved to provide good contact with the road surface when the motorcycle is steeply banked during cornering.

In common with most other types of tires, in order for these tires to perform well under all conditions it is usual for the ground contacting tread region of the tire to be provided with relatively deep grooves in the surface. In wet conditions such grooves assist in clearing water from the contact area between the tire tread and the road surface and thus help to retain steering control of the vehicle by preventing aquaplaning.

However the provision of such grooves effectively weakens the tire tread and renders it more prone to wear. This occurs because such grooves divide the tread into discrete elements such as ribs and blocks which individually are more susceptible to deformation in the tire/ground contact region due to the tractive and cornering forces transmitted therein and therefore wear by abrasion against the road surface.

In making the present invention, the inventors studied the alignment of the grooves of the tire tread and determined that it was possible to arrange these so as to minimize wear of the tread rubber and thus extend the useful life of the tire.

Accordingly it is an object of the present invention to provide a tire for a two-wheeled vehicle and a method of designing said tire which is improved in tread wear.

According to the present invention a tire for a two-wheeled vehicle comprises a ground contacting tread having tread grooves formed therein, characterized in that in a first region of the tire tread, which is the central tread region and is the region of contact between the tire and the ground when the motorcycle is in the condition of moving in a straight line, the alignment of the tread grooves is substantially circumferential, and in a second region of the tire tread, which is at the axial edge of the tread and is the region of contact when the motorcycle is in the condition of turning under maximum cornering, the alignment of the tread grooves is substantially transverse, and in a third region, which is the tread region between the first central region and the second axial region and which provide the ground contacting regions when the motorcycle is turning at less than the maximum cornering condition, the groove alignment changes progressively axially outwardly from substantially circumferential to substantially transverse so that in the ground contacting region when it is in the first, second or third region the tread grooves are substantially aligned with the resultant forces acting on the tire tread surface.

Preferably in the third region of the tread the alignment of the groove at any axial point is the same as the direction of the force resultant from the addition of the longitudinal and lateral forces acting on the tread at that point when the motorcycle on which the tire is mounted is cornered at constant longitudinal acceleration such that said axial point is at the center of the contact region. The tread grooves are preferably continuous from the tread center to the tread edge.

According to another aspect the invention provides a method of determining the required tread groove angle to form the tread pattern of a tire for a two-wheeled vehicle to give optimum tread wear comprising at successive axial points across the tread from the center to the tread edge aligning the tread groove in the direction of the typical slippage of the tread at that axial point when the point is in the tire/road contact region.

A preferred method of the invention provides a method of determining the required tread groove angle to form the tread pattern of a tire for a two-wheeled motorcycle to give optimized tread wear in use on a motorcycle comprising deciding on the typical longitudinal acceleration of the motorcycle during cornering in the particular manner of riding and determining the corresponding longitudinal force on the tire, and subsequently for successive axial points across the tread surface from the tread center to the tread edge corresponding to successive values of camber of the tire determining the lateral acceleration of the tire and the corresponding lateral force on the tire, determining the direction of the force resultant from the addition of the longitudinal and lateral forces and aligning the tread groove portion at that particular axial point with the direction of the determined resultant force.

Further aspects of the invention will become apparent from the following description by way of example only of embodiments of the invention in conjunction with the following drawings in which.

Figure 2:
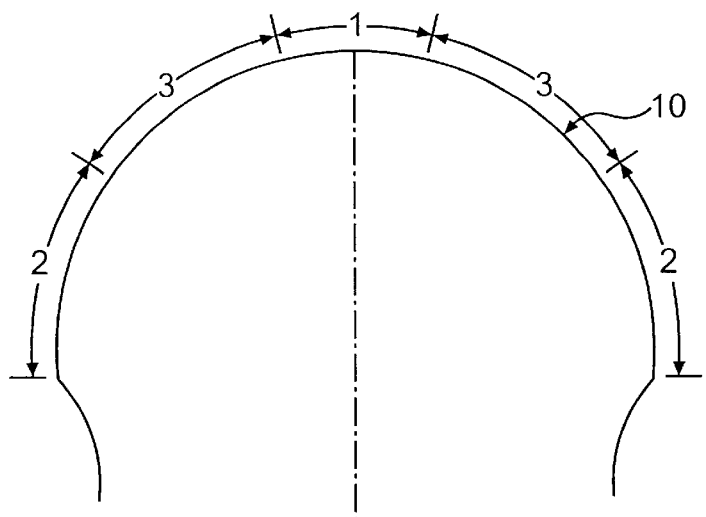
FIG. 2 shows the axial profile of the tire of FIG. 1.

Shown in FIG. 2 is a schematic diagram of the axial profile of a motorcycle tire according to the present invention. The curved tread surface 10 is nominally divided into a first region 1 at the tread center, second regions 2 at each tread edge and third regions 3 between the first region and each of the second regions.

Each of these three nominal regions corresponds to that part of the tread surface which is in contact with the road surface under various conditions encountered in riding a motorcycle or motorscooter.

Thus the first or central region 1 corresponds to that part of the tread which is in contact with the road surface when the vehicle is running in a straight line. The second or edge regions 2 correspond to that part of the tread which is brought into contact in extreme cornering when the vehicle is fully banked over, whilst the third or middle regions 3 are those which contact the road surface when the vehicle is cornering moderately.

According to the present invention the alignment of tread grooves in these three nominal regions of the tread is such that at every axial position the groove direction is substantially the same as the direction of typical slippage due to the resultant forces acting on the tread surface at that position when the position concerned is in the contact patch.

Figure 1:
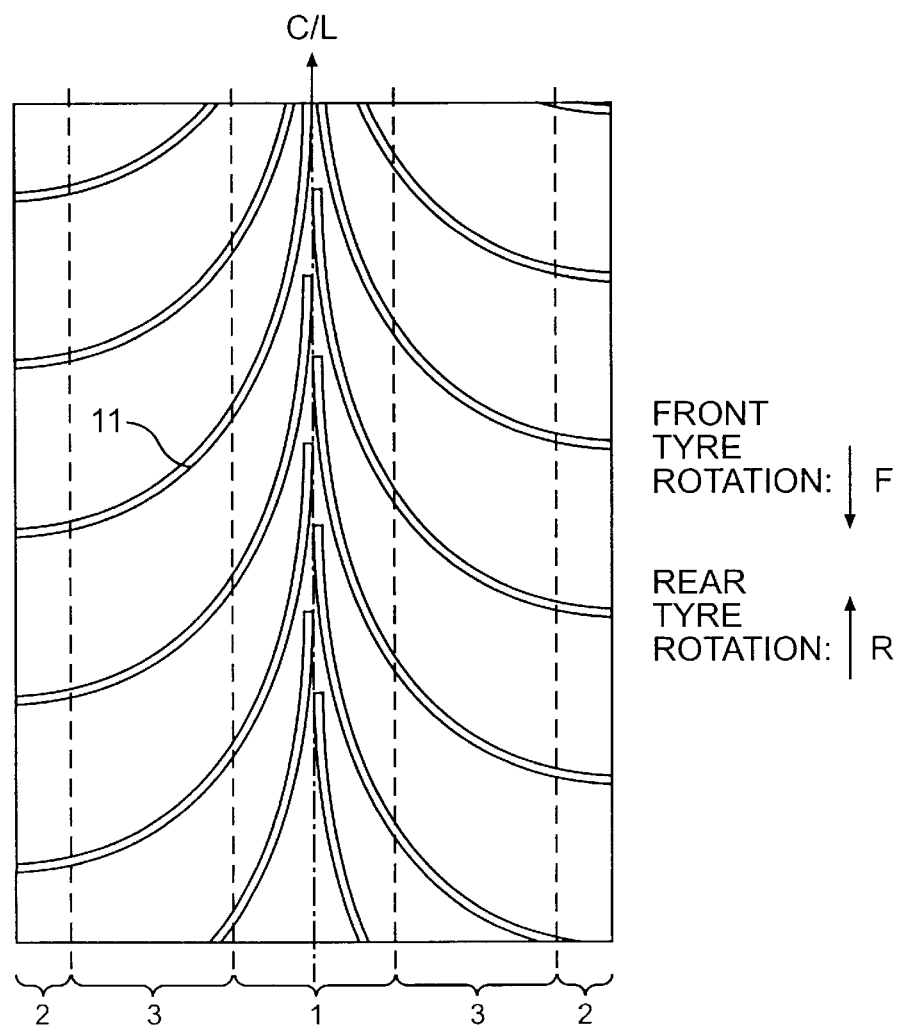
FIG. 1 shows a plan view of a part of a motorcycle tire tread in accordance with the invention.

Thus as can be seen in FIG. 1 in the first or central region 1 the grooves 11 in the tread are orientated substantially parallel to the circumferential direction C/L of the tire so that they are aligned with the predominantly longitudinally directed acceleration or braking forces acting on the tread when the vehicle is travelling in a straight line and therefore in an upright position.

Conversely in the second region 2 at the tread edge the tread grooves are orientated substantially axially, i.e. normal to the circumferential direction C/L, so that they are aligned with the predominantly laterally directed force acting on the tire when the vehicle is fully banked under extreme cornering.

In the third or middle region 2 the orientation of the tread groove 11 changes smoothly and progressively from circumferential to axial moving in the axially outwards direction. Within the third region the alignment of the groove at any axial position is the same as the direction of the force which is the resultant force from the addition of both the longitudinal and lateral forces acting in the tread contact region centered on that axial position.

Figure 4:
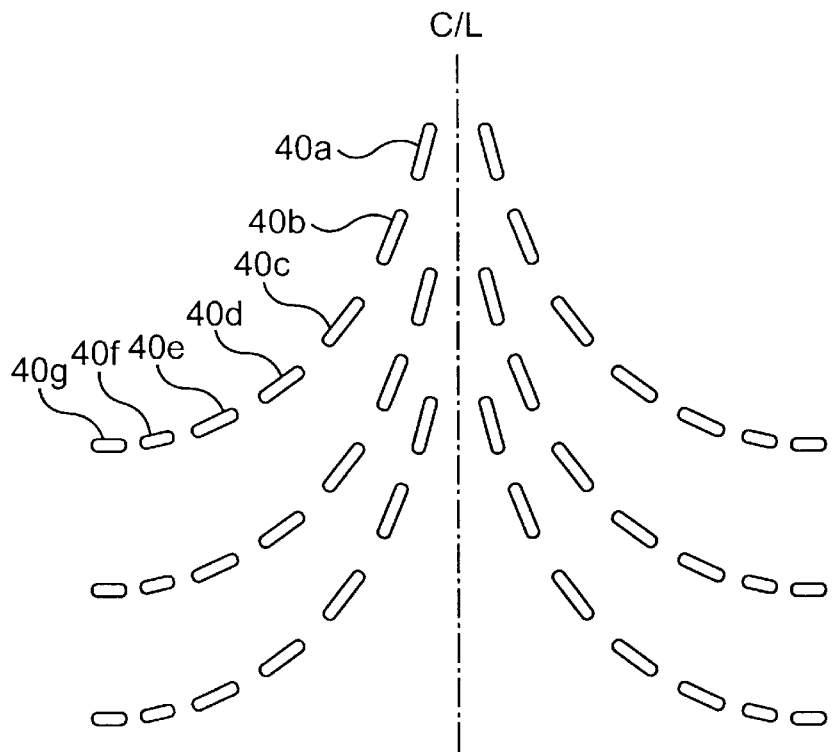
FIG. 4 shows a further example of tread pattern groove alignments in accordance with the invention.
Figure 5:
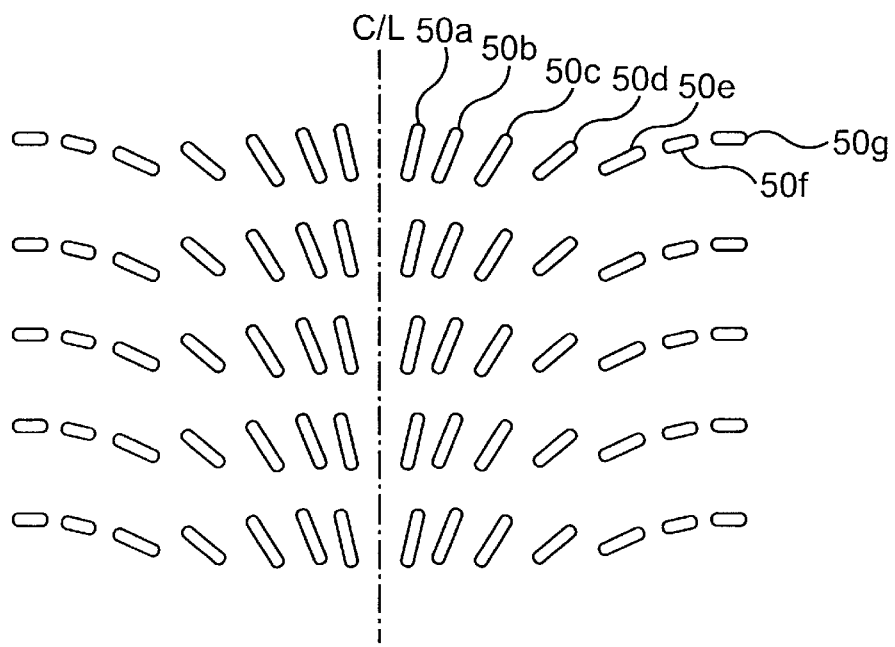
FIG. 5 shows another example of tread pattern groove alignments according to the invention.

The tread grooves may be continuous from the tread center to the tread edge as in FIG. 1 or they may be discontinuous as in FIGS. 4 and 5 wherein each groove portion (40a–40g,50a–50g) is aligned according to the invention. The tire tread may also have circumferential grooves as common in the art.

In an alternative embodiment the tread between adjacent grooves is substantially continuous. Thus there are no other major tread grooves intersecting the grooves aligned according to the invention and therefore the tread is not divided into blocks which are susceptible to wear on their leading and trailing edges.

For the purposes of providing a generally optimized groove alignment such as depicted in FIG. 1 the inventors have found that a cosecant curve gives an acceptable shape which improves tread pattern wear. This is implemented as y=cosecant (x) wherein y is the circumferential tire direction and x is the axial direction.

The invention also provides a method of determining the required tread groove angle or alignment to form the tread pattern having optimum, i.e. minimum, tread wear. This method comprises at successive axial points across the tread from the center to the tread edge aligning the tread groove in the same direction as typical slippage due to the resultant force acting on the tread when the axial point concerned is at the center of the tread/road contact region.

This method may be implemented either by practical means or by calculation as will be explained below.

For the method by calculation it has been found expedient to determine by direct calculation the direction of the resultant force acting on the tread at an axial point in the contact region and aligning the groove at that point in this same direction.

In the practical implementation of the method the tire, preferably an unused tire, is provided with an array of small holes, preferably circular in shape at the tire surface, to provide a hole at each axial position across the tread surface. The tire is then run on the vehicle under all riding conditions to initiate wearing of the tread over its entire width. The tread wear will become apparent with the appearance of a pattern of wear emanating in a particular direction from each small hole according to the axial position of the hole. Subsequently the tread groove pattern can be formed or cut into the tread of another tire by aligning the tread groove at any particular axial position in the same direction as the wear pattern emanating from the hole at that position on the worn tire.

Furthermore in accordance with the calculation method of the invention the align men t of tread grooves may be further optimized according to the anticipated manner of riding or anticipated use of the vehicle. Thus the invention provides a method of optimizing the groove alignment for example of a tire for a high performance racing motorcycle which could be expected to be ridden with high acceleration and braking and under extreme cornering conditions of high acceleration with full camber, and contrastingly a tire for a lower performance motorcycle or motorscooter such as a small-engined moped which can reasonably be expected to be ridden more sedately.

Thus according to the method of the invention the tire design engineer firstly decides on the typical longitudinal acceleration which the tire will experience in cornering according to the anticipated manner of riding or anticipated use of the vehicle, and the corresponding longitudinal force acting on the tread in the tire/road contact region. For example the tire design engineer may decide that for a tire intended for a high performance high powered motorcycle a longitudinal acceleration value in excess of 0.5 g may be appropriate whereas for a low powered moped a value of less than 0.1 g is appropriate.

Subsequently for successive axial points across the tread from the center to the edge, which points when considered to be at the center of the contact region correspond to particular camber values, the lateral acceleration and thus the lateral force acting on the tire is determined. Now knowing the longitudinal and lateral forces acting at successive axial point of the tread when such points are centered in the tire/road contact region, the direction of the resultant force from the vector addition of this two known forces can be determined, and the groove portion at that point should be then aligned with the direction of this resultant force.

Figure 3:
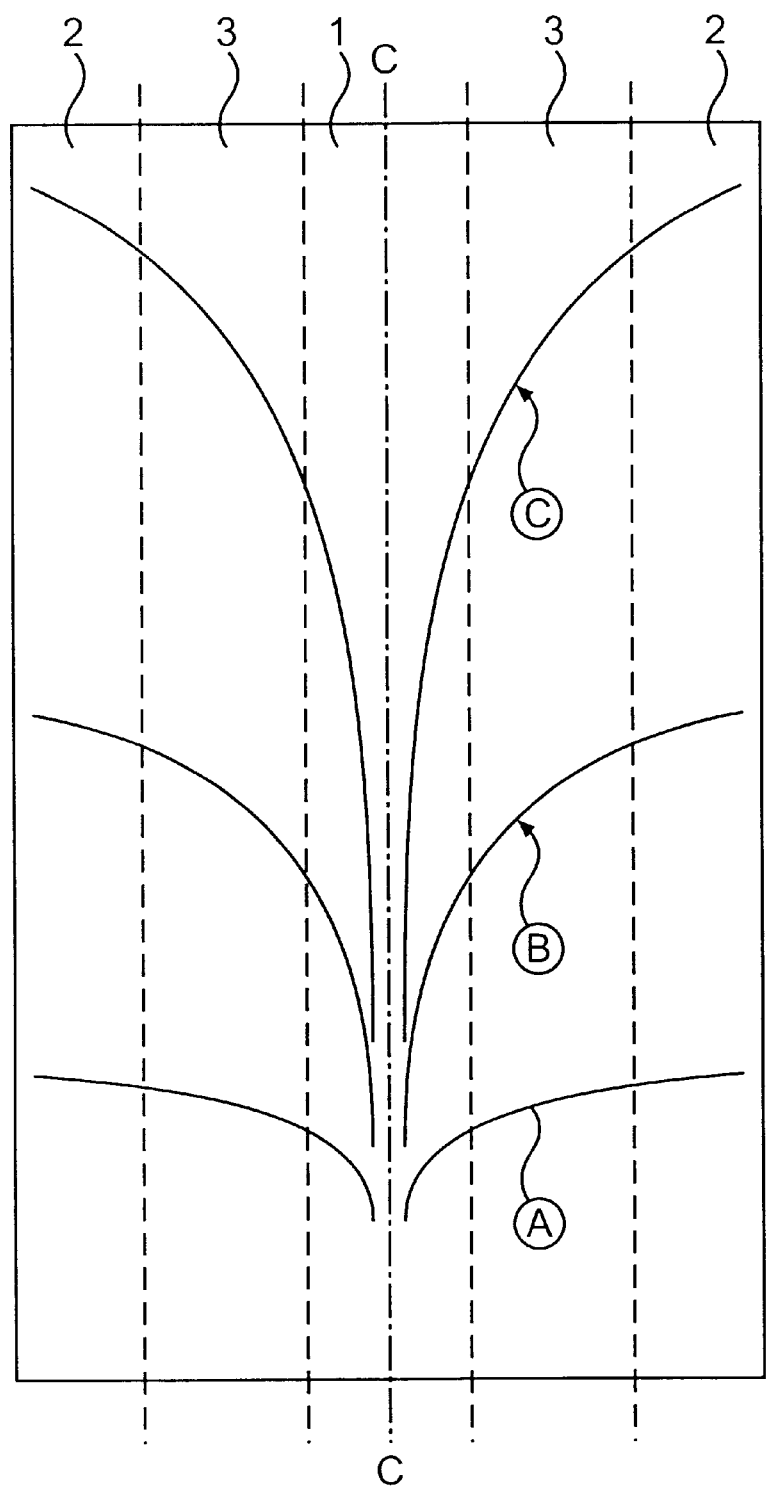
FIG. 3 is a schematic diagram being a developed view of a tread showing the alignments of three further grooves A,B,C in accordance with the invention.

By way of example of the results of the application of the above method FIG. 3 shows the alignment of three tread grooves denoted schematically by the single lines A,B,C which represent the optimum groove arrangements for three tires with widely different anticipated manners of use. FIG. 3 shows the developed shapes of these alignments.

Thus the groove pattern A represents an optimized shape for a tire for a low performance usage as for example on a small-engined motorcycle or a moped. For this tire a typical longitudinal acceleration value in cornering of only 0.1 g was used.

In contrast groove pattern C represents the optimized shape for a high performance usage, such as on a racing motorcycle. For this tire a longitudinal acceleration value in cornering of 0.6 g was used.

The groove shape B represents the optimized alignment for a tire for intermediate performance usage. For this tire a longitudinal acceleration value in cornering of 0.3 g was used.

In the above references to longitudinal acceleration it is understood to include longitudinal deceleration, i.e. braking, which is regarded, as is normal in the art, as an acceleration negatively signed.

In view of load transfer considerations the optimization of the groove alignment of the tires should be carried out on the basis that the vehicle front tire is optimized for braking whilst the rear tire is optimized for acceleration. Such a basis gives rise to the directional fitment of the tread pattern indicated in FIG. 1 in which when the vehicle is moving forward the front tire rotates in the direction of arrow F whilst the rear tire rotates in the direction of arrow R.

Whilst the above embodiments describe the groove angles or alignments at the tread center and tread edges as 0° and 90° respectively to the tire circumferential direction other angles such as 10° and 80° respectively may be used which will retain to a large degree the advantage of reduced tread wear in accordance with the invention.

Having now described our invention what we claim is:

1. A method of determining a required groove angle to form a tread pattern of a tire tread of a tire for a two-wheeled vehicle to give optimum tread wear comprising the steps of:

forming small holes in a tread surface of a tread of a tire at successive axial positions across the tread of the tire from a center of the tread to an edge of the tread;

running the tire on the two-wheeled vehicle to initiate a pattern of wear emanating from each small hole; and forming tread grooves in the surface of a tire tread of a subsequent tire such that at any particular axial point the tread grooves are aligned in the same direction as the pattern of wear emanating from the small hole formed at that point on the worn tire so that each groove has said required angle, which is with respect to the circumferential direction, and so that each groove is substantially aligned in the direction of a resulting force acting on the tire tread at successive axial points across the tire tread from a center of the tire tread to an edge of the tire tread when the axial points are in a region of contact between the tire tread and a road.

2. A method according to claim 1, wherein the small holes are circular in shape.

3. A method of determining a required groove angle of a tread groove to form a tread pattern of a tire tread of a tire for a two-wheeled vehicle to give optimum tread wear comprising:

deciding a value for longitudinal acceleration of a tire of a two-wheeled vehicle during cornering;

determining a longitudinal force on the tire corresponding to the value for longitudinal acceleration of the tire; and subsequently for successive axial points across a tread surface of the tire tread from a center of the tire tread to an edge of the tire tread determining a lateral acceleration of the tire and a lateral force on the tire corresponding to the lateral acceleration wherein each successive axial point is at the center of the contact region of the tire;

for each of said successive axial points, determining a direction of a force resultant force the vector addition of the longitudinal forces and lateral forces; and at each of said successive axial points, aligning the tread groove substantially in the direction of the determined resultant force acting on the tire tread at that particular axial point when said particular axial point is in a region of contact between the tire tread and a road.

* * * * *